June 28, 1966  E. L. CLARK  3,258,741
ACOUSTICAL SIGNAL GENERATION BY ELECTRICAL COILS
DEFLECTING A DIAPHRAGM
Filed Aug. 13, 1962  2 Sheets-Sheet 1

INVENTOR.
E.L. CLARK
BY Young & Quigg
ATTORNEYS

United States Patent Office 3,258,741
Patented June 28, 1966

3,258,741
ACOUSTICAL SIGNAL GENERATION BY ELECTRICAL COILS DEFLECTING A DIAPHRAGM
Ernest L. Clark, Bartlesville, Okla., assignor to Phillips Petroleum Company, a corporation of Delaware
Filed Aug. 13, 1962, Ser. No. 216,566
2 Claims. (Cl. 340—17)

This invention relates to the generation of acoustical signals.

A knowledge of the velocity of propagation of acoustical waves in earth formations is valuable in analyzing oil producing regions intersected by wells and in making seismic surveys. These velocities can be measured by lowering an acoustical signal generator and one or more detectors into a well to make measurements at various depths. Signal generators for use in this manner should be capable of establishing sharply defined acoustical signals repetitively in order that a plurality of measurements can be made in a given well.

The present invention is directed toward providing an acoustical signal generator which can be employed to advantage in well logging and seismic studies. The acoustical signal is generated by rapidly flexing a diaphragm which has one side thereof positioned in contact with a liquid so as to transmit a compressional wave through the liquid. This flexure is advantageously accomplished by positioning two coils adjacent one another on the side of the diaphragm remote from the liquid. A large current pulse is transmitted through the two coils, which are positioned so that the resulting magnetic fields established about the coils oppose one another. This results in the rapid movement of the two coils away from one another so that the one adjacent the diaphragm displaces the diaphragm into the liquid. In another embodiment of the signal generator of this invention, two separate diaphragms are employed with the two coils disposed therebetween. The rapid movement of the two coils away from one another thus results in both diaphragms being flexed to transmit acoustical waves into liquid surrounding the two diaphragms.

Accordingly, it is an object of this invention to provide a novel acoustical signal generator.

Another object is to provide a method of generating acoustical signals in liquids.

A further object is to provide a method of and apparatus for generating acoustical signals in boreholes.

Other objects, advantages and features of the invention should become apparent from the following detailed description, taken in conjunction with the accompanying drawing in which.

Figure 1:
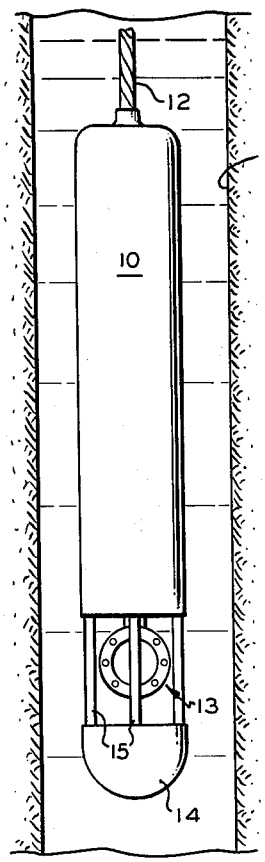
FIGURE 1 illustrates a first embodiment of the signal generator of this invention disposed in a borehole.

Referring now to the drawing in detail and to FIGURE 1 in particular, there is shown a casing 10 which is suspended within a borehole 11 by means of a cable 12. An acoustical signal generator 13 is suspended beneath casing 10, and a weight 14, is suspended beneath generator 13 by a plurality of rods 15. This weight aids in lowering the casing into the borehole and protects the signal generator.

Figure 2:
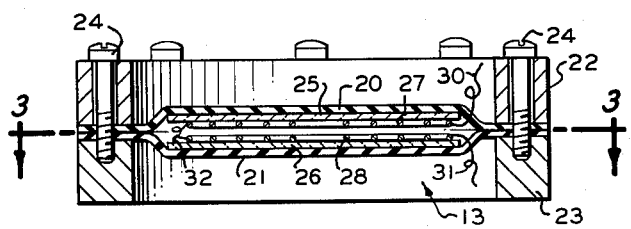
FIGURE 2 is a detailed view, shown partially in section, of the signal generator of FIGURE 1.
Figure 3:
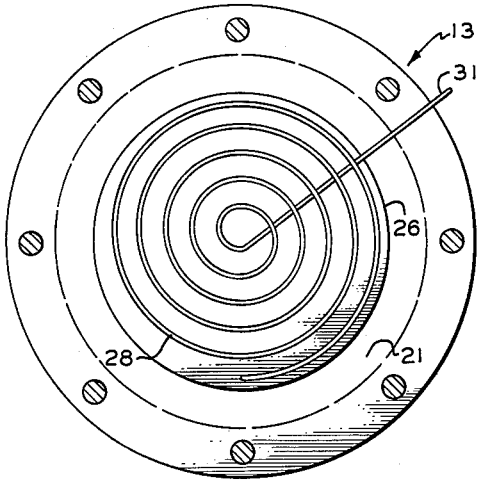
FIGURE 3 is a view taken along line 3—3 of FIGURE 2.

Signal generator 13 is illustrated in detail in FIGURES 2 and 3. Two flexible diaphragms 20 and 21 are secured together at their peripheries by rings 22 and 23 which are attached by screws 24. Circular plates 25 and 26 are positioned between the diaphragms, and advantageously are secured to respective diaphragms 20 and 21 by means of a suitable adhesive. Spiral coils 27 and 28 are secured to respective plates 25 and 26. These coils can be bound to the plates by a suitable adhesive or potting compound. If desired, the plates can be provided with recesses to receive the coils. The coils are covered with a nonconductive material, which can be the adhesive, so that they remain electrically insulated from one another when the diaphragms are collapsed. Electrical leads 30 and 31 are connected to corresponding first ends of respective coils 27 and 28. The second ends of the coils are connected to one another by means of a flexible conductive spring 32.

The apparatus illustrated in FIGURES 2 and 3 is constructed so that the hydraulic pressure on the resilient diaphragms normally holds the two coils in close proximity to one another. The two diaphragms are sealed in their peripheries with a certain amount of air being trapped therebetween. In operation, a surge of current is passed through the two coils, which are wound with respect to one another so that the resulting magnetic fields set up by the coils oppose one another, thereby resulting in the rapid movement of the coils away from one another. This rapid movement displaces the liquid in the borehole which surrounds the diaphragms such that acoustical waves are set up which travel through the liquid and the surrounding earth formations.

Figure 4:
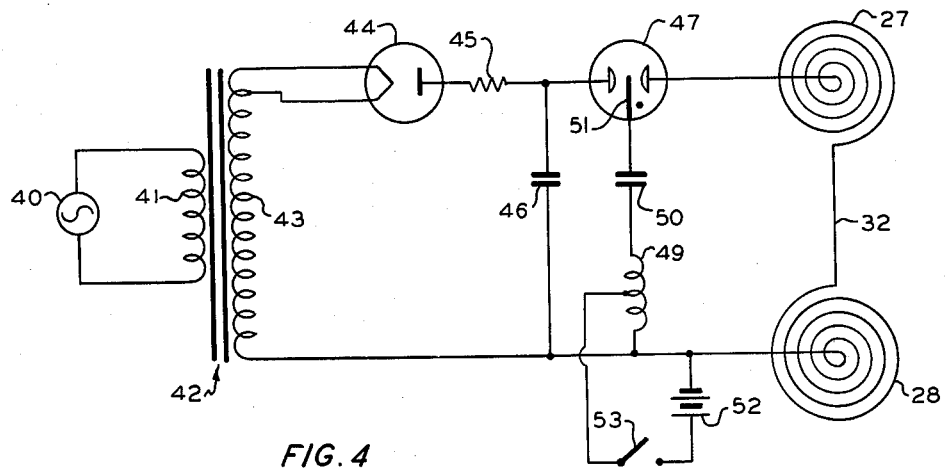
FIGURE 4 is a schematic circuit drawing of the electrical components associated with the signal generator of this invention.

A suitable circuit for energizing the signal generator is illustrated schematically in FIGURE 4. An alternating current source 40 is connected across the primary winding 41 of a step-up transformer 42. The first end terminal of the secondary coil 43 of transformer 42 is connected to one terminal of the heater-cathode of a rectifier 44. The second terminal of this cathode is connected to winding 43 adjacent the first end terminal thereof. The anode of rectifier 44 is connected through a resistor 45 to the first terminal of a capacitor 46. The second terminal of capacitor 46 is connected to the second end terminal of transformer winding 43. The first terminal of capacitor 46 is connected through a spark gap switch 47 to the first terminal of coil 27. The second terminal of capacitor 46 is connected to the first terminal of coil 28. The coil 49 of an auto-transformer is connected between the second terminal of capacitor 46 and the first terminal of a capacitor 50. The second terminal of capacitor 50 is connected to a probe 51 which extends into spark gap switch 47. A battery 52 and a switch 53 are connected in series between one end terminal of coil 49 and an intermediate point thereon.

In the operation of the circuit illustrated in FIGURE 4, switch 53 initially is open. Rectifier 44 conducts to charge capacitor 46. When it is desired to actuate the signal generator, switch 53 is closed so that a current pulse flows through the lower portion of coil 49. This induces a voltage in the upper portion of the coil which transmits a spark to switch 47. This spark causes the switch to conduct so that capacitor 46 is discharged through coils 27 and 28. As previously mentioned, these coils are wound in opposing relationship so that the coils are moved apart by the magnetic fields. It is desirable that transformer 42 be of such configuration as to establish a large output voltage and that capacitor 46 be quite large so that a substantial amount of energy is stored by the capacitor. A current flow of several thousand amperes through the coils is desirable to produce rapid flexure of the diaphragms.

In well logging operations, it is generally desirable to position transformer 42 and the associated circuit elements within casing 10. Alternating current source 40 can be located at the surface with connecting leads passing through cable 12. Of course, a portable power supply can be mounted in casing 10 if necessary. Switch 53 can be operated periodically by means of a timer, not shown, which can be contained within casing 10 or connected to the mechanism which lowers the casing into the well such that the switch is operated each time the casing is lowered by a given amount. If desired, switch 53 can be located at the surface with connecting wires passing through cable 12.

Figure 5:
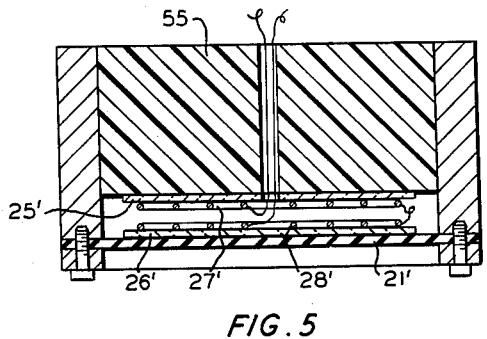
FIGURE 5 is a view, shown partially in section, of a second embodiment of the signal generator.

A second embodiment of the signal generator is illustrated in FIGURE 5. In this embodiment, a single diaphragm 21′ is utilized. Plate 25′ is secured to a rigid member 55 which is fastened to the casing. Member 55 can be constructed of any suitable nonmagnetic material. The operation of the signal generator illustrated in FIGURE 5 is identical to that previously described except that only the single diaphragm 21′ is displaced into the surrounding fluid. The apparatus illustrated in FIGURE 5 is particularly useful in making seismic surveys wherein it is desired to direct the resulting acoustical signals downwardly into lower formations. In this regard, it should be evident that either of the signal generators can be positioned in any desired direction with respect to casing 10 to direct the resulting compressional waves in a selected direction.

While this invention has been described in conjunction with presently preferred embodiments, it should be evident that it is not limited thereto.

What is claimed is:

1. Apparatus adapted to generate an acoustical signal under water comprising a rigid member adapted to be submerged in water; a flexible diaphragm; means positioning said diaphragm in parallel spaced relationship with one face of said member so as to form a fluid-tight chamber between said member and said diaphragm; a first flat spiral coil positioned within said chamber in engagement with said diaphragm; a second flat spiral coil positioned within said chamber in engagement with said one face of said member; said coils being positioned so that the planes thereof are parallel to one another and parallel to said diaphragm; and means to transmit current through said coils in series and in directions so that the resulting magnetic fields set up about said coils move said coils apart in a direction perpendicular to the planes of said coils, whereby said diaphragm is moved away from said member by the resulting movement of said second coil away from said first coil, and thereby displaces water in engagement with said diaphragm to generate an acoustical signal, said means to transmit current comprising a step-up transformer, an alternating current source applied to the primary winding of said transformer, a rectifier and a first capacitor connected in series with the secondary winding of said transformer, a spark gap switch having two spaced electrodes and a spark probe, means connecting the electrodes of said spark switch in series with said first and second coils across said first capacitor, a second capacitor, an autotransformer connected through said second capacitor to the probe of said spark switch, a voltage source, and switching means connecting said voltage source across a portion of said autotransformer so that closure of the switching means applies current to said portion of said autotransformer to generate a spark at said probe, thereby establishing conduction through said spark switch so as to discharge said capacitor through said first and second coils.

2. Apparatus adapted to generate an acoustical signal under water comprising an elongated casing which is adapted to be submerged in water; a weight; means positioning said weight in spaced relationship with one end of said casing so as to form an open space therebetween which is open to water in which the casing and weight are submerged; first and second flexible diaphragms mounted in spaced relationship with one another within said open space so as to form a fluid-tight chamber therebetween; first and second flat coils positioned between said diaphragms so that the planes of said coils are parallel to one another and parallel to said diaphragms; and means to transmit current through said coils in series and in directions so that the resulting magnetic fields set up about said coils tend to move said coils apart in a direction perpendicular to the planes of said coils, whereby movement of said coils away from one another results in displacement of said diaphragms away from one another to impart an acoustical signal to the water in which the apparatus is submerged, said means to transmit current comprising a step-up transformer, an alternating current source applied to the primary winding of said transformer, a rectifier and a first capacitor connected in series with the secondary winding of said transformer, a spark gap switch having two spaced electrodes and a spark probe, means connecting the electrodes of said spark switch in series with said first and second coils across said first capacitor, a second capacitor, an autotransformer connected through said second capacitor to the probe of said spark switch, a voltage source, and switching means connecting said voltage source across a portion of said autotransformer so that closure of the switching means applies current to said portion of said autotransformer to generate a spark at said probe, thereby establishing conduction through said spark switch so as to discharge said capacitor through said first and second coils.

References Cited by the Examiner
UNITED STATES PATENTS

| | | | |
|---|---|---|---|
| 314,155 | 3/1885 | Taylor | 179—115.5 |
| 1,471,547 | 10/1923 | Chilowsky et al. | 340—8 |
| 1,743,265 | 1/1930 | Depew. | |
| 1,965,226 | 7/1934 | Fessenden | 340—12 |
| 2,956,278 | 10/1960 | Branchu | 340—14 |
| 2,964,730 | 12/1960 | Blanchard | 340—12 |
| 2,967,956 | 1/1961 | Dranetz et al. | 340—8 |

BENJAMIN A. BORCHELT, *Primary Examiner.*

CHESTER L. JUSTUS, *Examiner.*

R. M. SKOLNIK, P. A. SHANLEY, *Assistant Examiners.*